United States Patent
Inoue et al.

(10) Patent No.: US 6,520,873 B2
(45) Date of Patent: Feb. 18, 2003

(54) GOLF BALL WITH SPACED PARTING LINE

(75) Inventors: Michio Inoue, Chichibu (JP); Keisuke Ihara, Chichibu (JP); Hirotaka Shimosaka, Chichibu (JP); Atuki Kasasima, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 09/148,867

(22) Filed: Sep. 8, 1998

(65) Prior Publication Data
US 2002/0002086 A1 Jan. 3, 2002

Related U.S. Application Data

(62) Division of application No. 08/666,222, filed on Mar. 13, 1998, now Pat. No. 5,840,351.

(30) Foreign Application Priority Data
Jun. 21, 1995 (JP) .............................................. 7-178130

(51) Int. Cl.⁷ .............................................. A63B 37/14
(52) U.S. Cl. ....................................................... 473/378
(58) Field of Search ................................. 473/378, 384

(56) References Cited

U.S. PATENT DOCUMENTS

| | | | | |
|---|---|---|---|---|
| 699,632 A | | 5/1902 | Richards | 425/116 |
| 4,247,075 A | | 1/1981 | Rogers | 425/116 |
| 4,389,365 A | * | 6/1983 | Kudriavetz | 425/436 |
| 4,653,758 A | * | 3/1987 | Solheim | 473/378 |
| 4,915,369 A | * | 4/1990 | Ihara | 473/379 |
| 4,959,000 A | | 9/1990 | Giza | 425/116 |
| 4,991,852 A | * | 2/1991 | Pattison | 473/379 |
| 5,122,046 A | | 6/1992 | Lavallee et al. | 425/577 |
| 5,201,523 A | * | 4/1993 | Miller | 473/378 |
| 5,249,804 A | * | 10/1993 | Sanchez | 473/378 |
| 5,458,473 A | | 10/1995 | Banji | 425/116 |

* cited by examiner

Primary Examiner—Mark S. Graham
Assistant Examiner—Raeann Gorden
(74) Attorney, Agent, or Firm—Sughrue Mion, PLLC

(57) ABSTRACT

Using a mold having typically two split mold segments which are mated in a separable manner to define a spherical mold cavity therein, a golf ball having a multiplicity of dimples in its surface is molded by feeding a molding material into the mold cavity. The mold is split along a line off a horizontal great circle of the golf ball into two split mold segments having different areas of contact with the ball. The golf ball as molded is always caught and left in the larger mold segment and thus can be easily removed from the mold by a routine operation.

8 Claims, 2 Drawing Sheets

GOLF BALL WITH SPACED PARTING LINE

This is a divisional of application Ser. No. 08/666,222 filed Mar. 13, 1998, now U.S. Pat. No. 5,840,351 which is a CPA of original parent application filed Jun. 20, 1996.

BACKGROUND OF THE INVENTION

1. Field of the Invention

This invention relates to a mold for molding a golf ball which permits smooth ejection of the molded golf ball therefrom. The invention also relates to a golf ball formed using the mold.

2. Prior Art

Molds are conventionally used to mold golf balls. One exemplary mold is shown in FIG. 4. The mold includes separable upper and lower metallic mold halves 1 and 2 each formed with a hemi-spherical recess 3. The mold halves 1 and 2 are mated together to define a spherical cavity therebetween. Though not shown, the cavity surface is provided with a plurality of bosses for forming dimples in the surface of a golf ball. By feeding a molding material into the cavity, a golf ball 4 having a plurality of dimples in its surface is molded. The prior art mold is divided exactly at a horizontal plane corresponding to the equator 5 of the golf ball 4 into the equal mold halves 1 and 2.

This equal division gives rise to a problem when the mold halves 1 and 2 are separated at the end of molding of a golf ball. Since the golf ball surface is somewhat tacky immediately after molding, the golf ball sticks to the cavity surface. The upper and lower mold halves at their cavity surface have the same area of contact with the golf ball. Then it is uncertain whether the golf ball is caught in the upper mold half and removed from the lower mold half or caught in the lower mold half and removed from the upper mold half. This inconsistency is inconvenient for the subsequent operation of ejecting the golf ball from the mold.

The equal division is also disadvantageous in dimple distribution. Since the upper and lower mold halves are divided along the equator 5 of the golf ball 4, it is difficult to locate dimples across the equator of the golf ball. The dimple distribution must be designed such that no dimples are located on the parting line of the mold.

SUMMARY OF THE INVENTION

An object of the invention is to provide a golf ball-forming mold comprising mold segments wherein golf balls molded therein are always caught in one mold segment when the golf balls are to be ejected from the mold. Another object of the invention is to provide a golf ball which is molded using the mold so that dimples may be formed across a great circle of the ball.

The present invention provides a mold for molding a golf ball having a multiplicity of dimples in its surface by feeding a molding material into a mold cavity. The mold is composed of a plurality of, preferably two split mold segments which are mated in a separable manner to define a spherical mold cavity therein. The mold segments are split along a line off a great circle of the golf ball.

Also contemplated herein is a golf ball formed using the mold defined just above.

According to the invention, the split mold segments of the mold are split along a line off a great circle of the golf ball. When the split mold segments are mated together, the joint is off the great circle of the spherical cavity defined by the segments. When the two upper and lower mold segments are mated together, for example, the joint is off the equator of the spherical cavity defined by the segments. When the mold segments are separated for ejection, the respective mold segments at their cavity surface have different areas of contact with the golf ball. Then the golf ball as molded is caught in the mold segment of the larger contact area. That is, upon ejection, the golf ball always remains in one predetermined mold segment. Golf balls can then be always removed from the mold by a routine operation.

In producing golf balls using the mold according to the invention, since the parting line between the split mold segments is off a great circle of the spherical cavity, the parting line is not formed across the corresponding great circle of the golf ball. This permits dimples to be distributed on the great circle (the equator when the mold consists of two upper and lower mold segments) of the golf ball, contributing to the uniform distribution of dimples on the golf ball.

BRIEF DESCRIPTION OF THE DRAWINGS

These and further features of the present invention will be apparent with reference to the following description and drawings, wherein.

DETAILED DESCRIPTION OF THE INVENTION

Figure 1:
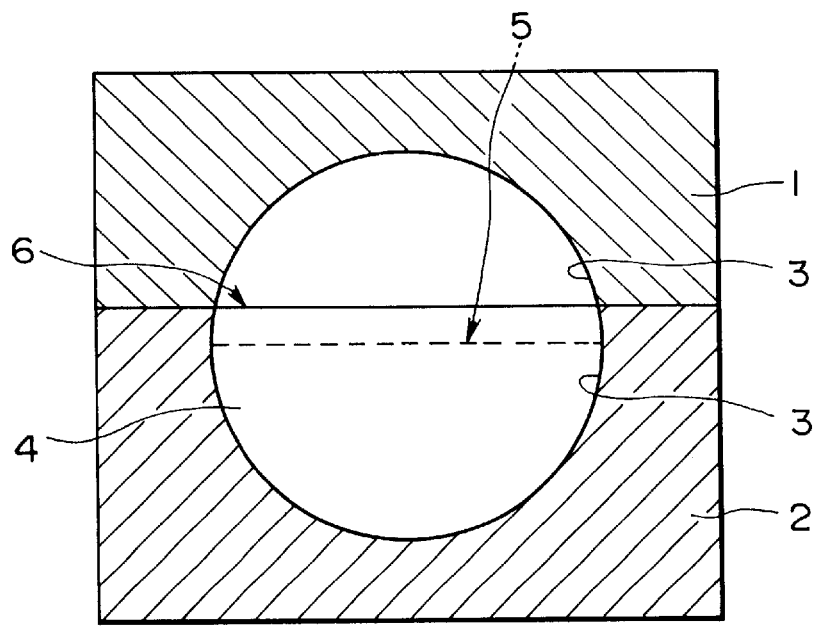
FIG. 1 is a schematic cross-sectional view of a mold according to one embodiment of the invention.
Figure 2:
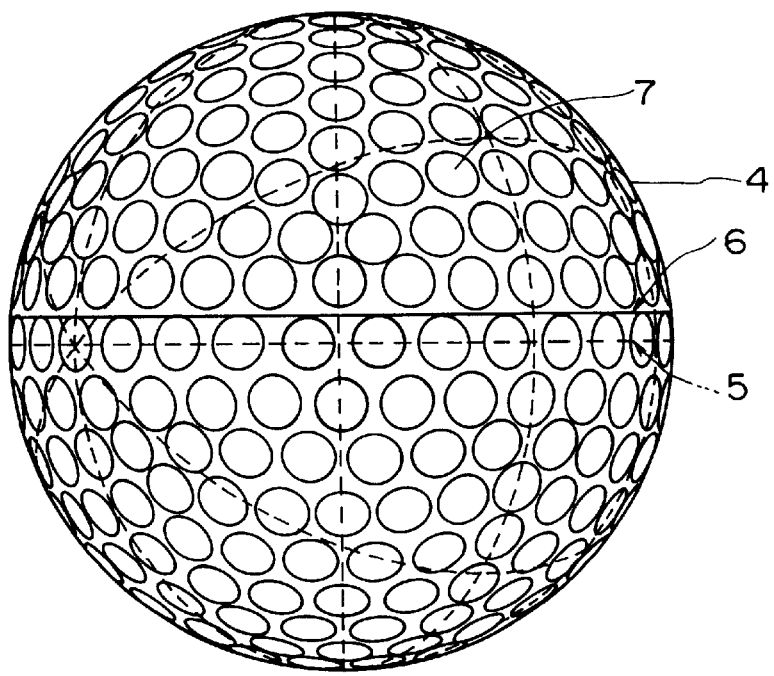
FIG. 2 is a side view of a golf ball formed using the mold of FIG. 1.
Figure 3:
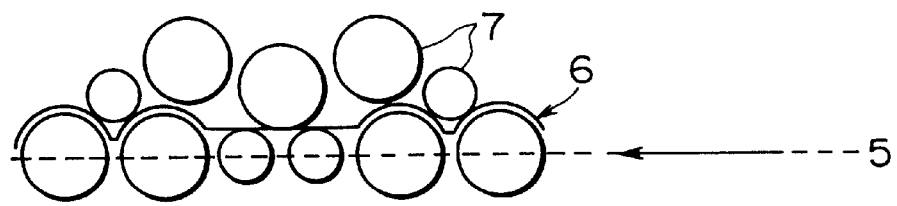
FIG. 3 is a view showing a portion of the surface of a golf ball formed using a mold according to another embodiment of the invention.
Figure 4:
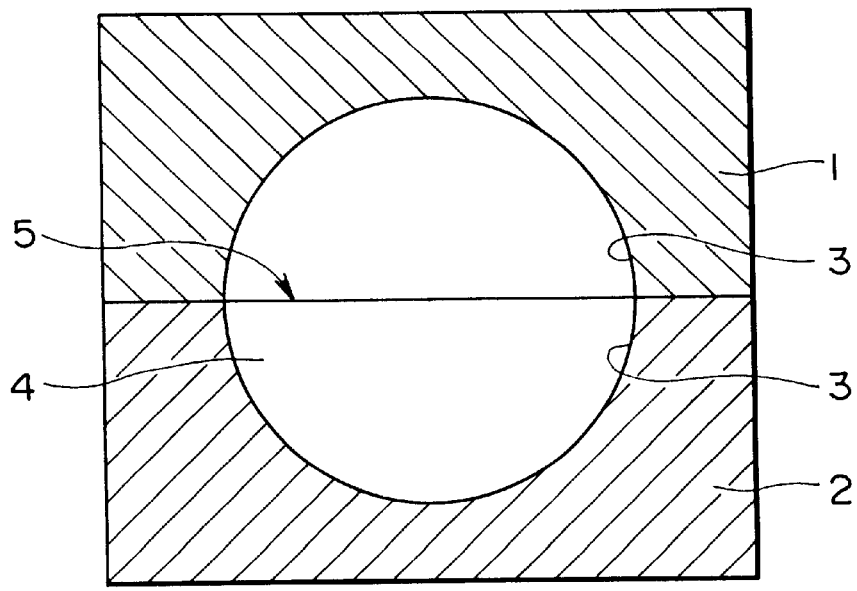
FIG. 4 is a schematic cross-sectional view of a prior art mold.

Referring to FIGS. 1 to 3, some embodiments of the invention are described. In these figures, like parts are designated by the same numerals as in FIG. 4 and their description is omitted.

FIG. 1 shows a mold according to one embodiment of the invention. The mold consists of two upper and lower-mold segments 1 and 2, like the prior art mold shown in FIG. 4. The difference from the prior art mold is that the mold segments 1 and 2 are split off the equator or great circle 5 of a golf ball 4 to be molded therein. In the illustrated embodiment, the mold is split at a horizontal plane 6 shifted above from the equator 5 into two mold segments (more particularly, a smaller upper segment and a larger lower segment). Of course, the mold may be split at a horizontal plane shifted below from the equator 5. Independent of whether the splitting plane is spaced vertically upward or downward from the equator, the spacing of the splitting plane from the equator is preferably 0.1 to 5 mm, more preferably 0.5 to 3 mm, most preferably 1 to 2 mm. If the spacing of the splitting plane from the equator is too small, golf balls would not be always caught in one mold segment upon opening of the mold and distributing dimples across the great circle of a golf ball would be difficult. A spacing that is to large of the splitting plane from the equator would make it difficult to take out the golf ball from the larger mold segment because the golf ball is of spherical shape, though the ball has some resilience.

Although the mold is preferably split along a horizontal plane as illustrated herein, the splitting plane is not limited thereto.

A golf ball is molded in the mold of the illustrated embodiment and then ejected from the mold after opening the mold. Since the upper mold segment 1 at its cavity surface has a smaller area of contact with the golf ball than the lower mold segment 2, the golf ball is always left in the cavity of the lower mold segment 2 having a larger contact area. Therefore, with the mold of the illustrated embodiment used, the golf ball is always left in one predetermined mold segment (lower segment in the illustrated embodiment) if the mold segments are separated in a predetermined order. An effective ejecting operation is thus ensured.

In the golf ball produced using the mold of the illustrated embodiment, the parting line of the mold does not pass across the great circle or equator. As shown in FIG. 2, the parting line 6 (solid line) left on the golf ball 4 is off the great circle or equator 5 (broken line) of the golf ball 4. Then dimples 7 can be distributed across the great circle or equator 5 of the golf ball 4, which is advantageous for uniform distribution of dimples. The mold split at the horizontal plane does not intersect any dimple 7, as shown in FIG. 2.

The invention is not limited to the embodiment illustrated in FIGS. 1 and 2. For example, the splitting of the mold is not limited to linear split as shown in FIG. 1. Any desired splitting line may be used. For example, a partially corrugated splitting line 6 extending substantially in a horizontal direction is shown in FIG. 3. The remaining components may also be modified without departing from the scope of the invention.

Any conventional molding technique may be used when a golf ball is molded using the mold of the invention. The preferred molding technique may be pressure vulcanization molding, compression molding or injection molding, for example. Any desired molding material may be used.

Although the mold of the invention is described in conjunction with the manufacture of golf balls, it may equally be applicable to the manufacture of golf ball cores and spherical bodies. More particularly, the mold for the manufacture of a spherical body serving as a core is composed of upper and lower mold segments which are mated to define a parting plane off the equator line of a spherical body to be molded therein, rather than upper and lower mold segments having the same hemi-spherical cavity. Then the spherical body is caught and left in either one of the mold segments when the mold is opened to eject the body therefrom. This ensures effective ejecting operation which can be completed within a shorter time.

The mold of the invention makes it easy to eject a golf ball therefrom because the golf ball as molded is always caught and left in one predetermined mold segment and thus can be removed from the mold by a routine operation. In producing golf balls using the mold, the parting line is not formed across the great circle of the golf ball, which is advantageous for the uniform distribution of dimples.

What is claimed is:

1. A golf ball comprising: a multiplicity of dimples and a parting line in its surface formed by feeding a molding material into a cavity of a mold having a plurality of split mold segments which are mated in a separable manner to define a spherical mold cavity therein, the mold segments being split along a parting line spaced from a great circle of the golf ball which is an imaginary parallel line positioned on one of said mold segments such that said parting line is not formed on any great circle of said golf ball and does not intersect said great circle which is the imaginary parallel line, wherein all dimples located on an equatorial portion of the golf ball surface are disposed only on one side of the parting line, wherein the distance of the parting line from the equator of the ball is in the range of 1 to 2 mm.

2. The golf ball of claim 1, wherein said parting line is formed by two split mold segments.

3. The golf ball of claim 2, wherein said parting line defined by said two mold segments is positioned at a horizontal plane spaced from the horizontal great circle of said golf ball.

4. The golf ball of claim 2, wherein said parting line is at a horizontal plane spaced vertically upward from the horizontal great circle of said golf ball.

5. The golf ball of claim 2, wherein the parting line defined by said two mold segments is positioned on a horizontal plane spaced vertically upward from the horizontal great circle of the golf ball.

6. The golf ball of claim 2, wherein said parting line at said horizontal plane does not intersect any dimples.

7. The golf ball of claim 2, wherein said parting line is a linear line circumferentially around said golf ball.

8. The golf ball of claim 2, wherein said parting line is in the form of a partially corrugated line.

* * * * *